(12) United States Patent
Bostak et al.

(10) Patent No.: US 6,707,589 B2
(45) Date of Patent: Mar. 16, 2004

(54) OPTICAL MODULATOR DRIVER CIRCUIT WITH LOW POWER DISSIPATION

(75) Inventors: Jeffrey S. Bostak, San Martin, CA (US); Ting-Kuang Chiang, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 10/317,784

(22) Filed: Dec. 11, 2002

(65) Prior Publication Data

US 2003/0234969 A1 Dec. 25, 2003

Related U.S. Application Data

(60) Provisional application No. 60/390,351, filed on Jun. 21, 2002.

(51) Int. Cl.[7] .............................. G02F 1/03; G02F 1/07; G09G 3/36; G09G 5/00
(52) U.S. Cl. ................. 359/245; 359/246; 359/248; 345/98; 345/100; 345/206
(58) Field of Search ................ 359/245, 246, 359/237, 248; 345/87, 92, 93, 98, 94, 96, 100, 206, 204; 349/47, 43, 49, 151, 152, 42, 138; 372/38, 26, 31; 385/2, 3

(56) References Cited

U.S. PATENT DOCUMENTS 6,192,167 B1 * 2/2001 Kissa et al. .................... 385/3
6,590,691 B1 * 7/2003 Nagra et al. ................ 359/237

* cited by examiner

*Primary Examiner*—Hung Dang
*Assistant Examiner*—Joseph Martinez
(74) *Attorney, Agent, or Firm*—W. Douglas Carothers, Jr.

(57) ABSTRACT

An optical modulator drive circuit provides a different approach to driving an optical modulator than presently employed, resulting in a reduction in power dissipation of the drive circuit by as much as 80%. Therefore, this invention dissipates as little as 20% of power of the present drive circuits known in the art. The optical modulator may be a semiconductor electro-absorption modulator but the principle of the invention can be applied any other type of electro-optic modulator that relies on a voltage to modulate an optical signal.

4 Claims, 2 Drawing Sheets

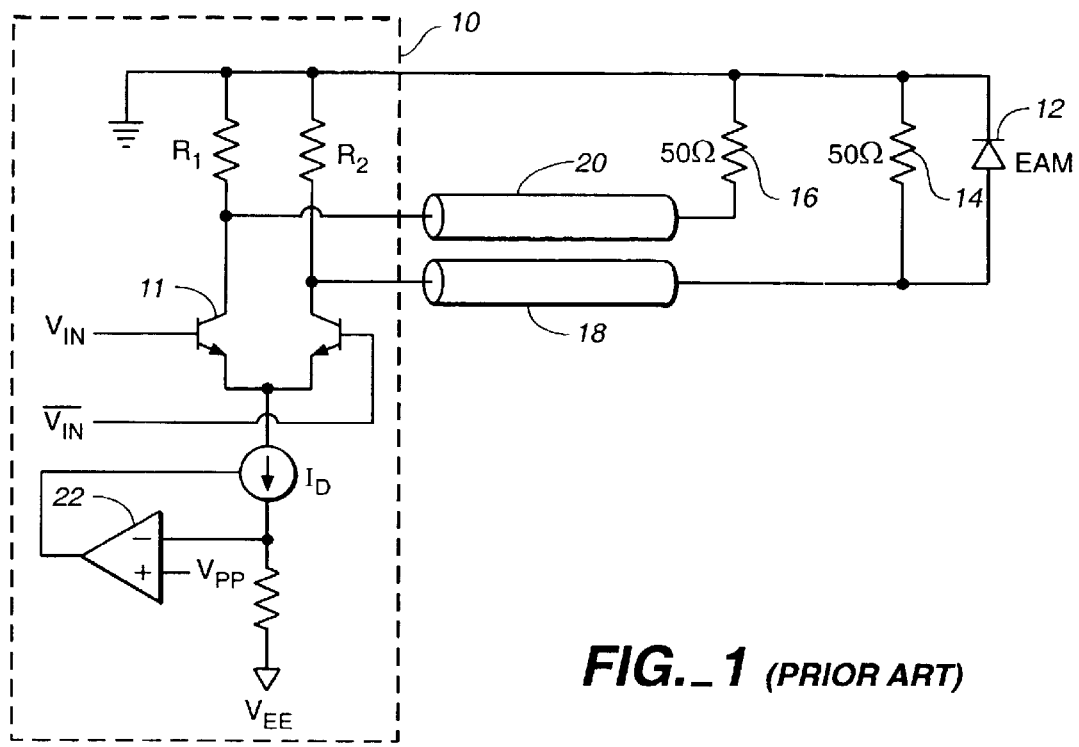
FIG._1 *(PRIOR ART)*
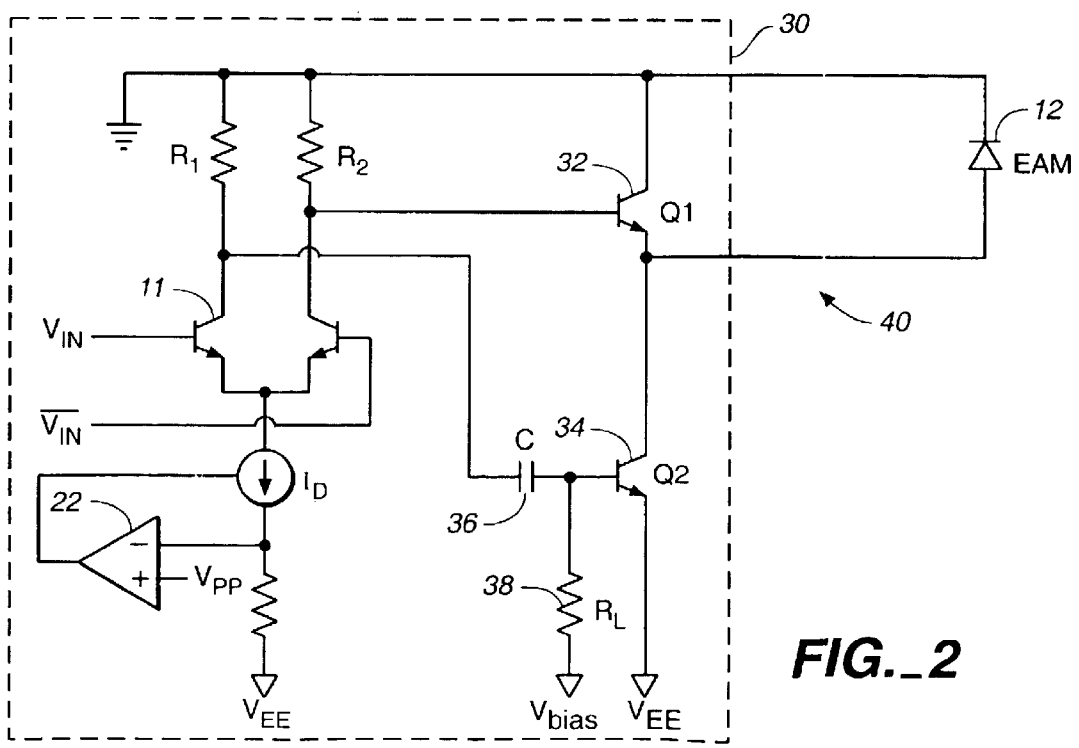
FIG._2

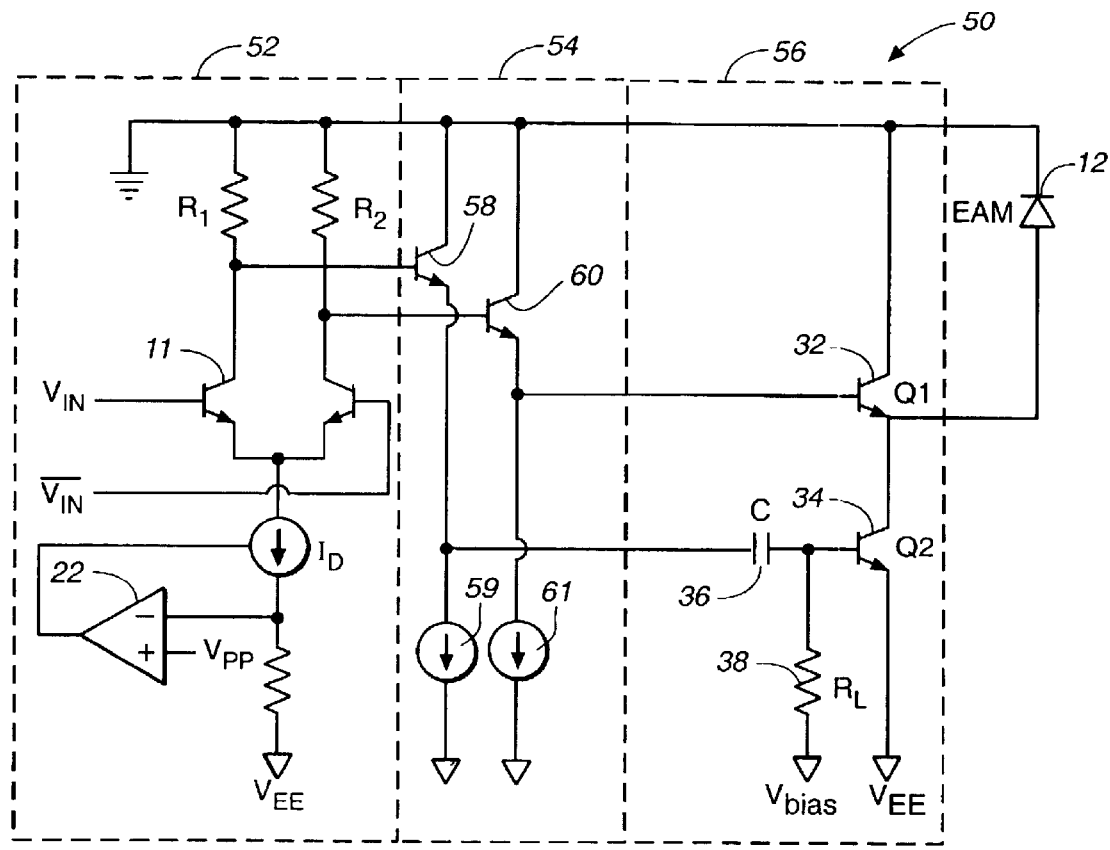
FIG._3

OPTICAL MODULATOR DRIVER CIRCUIT WITH LOW POWER DISSIPATION

REFERENCE TO RELATED APPLICATION

This application claims priority of provisional application, Ser. No. 60/390,351, filed Jun. 21, 2002, which provisional application is incorporated herein by its reference.

BACKGROUND OF THE INVENTION

1. Field of the Invention

This invention relates generally to modulator driver circuits and more particularly to an optical modulator with a driver output stage with low power dissipation.

2. Description of the Related Art

It is common practice in a drive circuit to employ transistor circuitry to provide a signal driver for modulating an electro-optical modulator, such as a Mach Zehnder modulator (MZM) or a semiconductor electro-absorption modulator (EAM). A typical driver circuit for an EAM is shown on U.S. Pat. No. 5,706,117 in FIG. 15, for example, as well as U.S. Pat. No. 6,014,392. The latter mentioned patent deals with wavelength dispersion of the EAM which is also discussed in U.S. Pat. No. 5,917,637. The output stage of such an optical modulator driver as known in the art is also illustrated in FIG. 1. In FIG. 1, the signal source shown as driver amplifier 22 controls the peak to peak amplitude of the transition bits representing the signal bits. The drive circuit 10 employs a differential transistor pair arrangement 11, also referred to as an emitter coupled differential circuit to provide current switching operation, which steers or directs the DC current to or away from optical modulator 12. Modulator 12 is shown here as a EAM. Because an optical modulator responds to voltage, and not to current, the drive current must be converted to a voltage. A load resistor is added in parallel with modulator 12, as shown in U.S. Pat. No. 5,706,117, to convert the drive current into a voltage. The power dissipation of circuit 10 is equal to the amount of the DC current, $I_D$, in drive circuit 10 times the DC supply voltage, $V_D$.

In the case of FIG. 1, there are two resistors 14 and 16 that are necessary to terminate the differential circuit. Only the voltage across resistor 14 is employed to drive modulator 12. This impedance across or in parallel with modulator 12 is generally designed to be a 50 ohm load, as indicated in FIG. 1, from which impedance matching is achieved relative to RF transmission lines 18 and 20. The resistance of resistors 14 and 16 is usually low, such as on the order of 50 Ω, in order to match its resistance to the low impedance RF transmission lines 18 and 20 which electrically couple the RF drive signal from the output driver stage 10 to EAM 12. The resistance of resistor 14 is also usually low in order that the modulator time constant, determined by the product of the optical modulator parasitic capacitance and its resistance, is low. As a result, the drive current, $I_D$, will be high resulting in high power dissipation. As an example, for 2.5 V amplitude and 25 ohm load, the current could be 100 mA, for a supply voltage, $V_{DD}$, about 5.2 V. This type of drive circuit 10 nominally consumes, for example, approximately 0.5 W of power.

One alternative approach is shown in the article of Kai-Yap Toh et al. entitled, "A 23-ps/2.1 mW ECL Gate with an AC-Coupled Active Pull-Down Emitter-Follower Stage", *IEEE Journal of Solid-State Circuits* (Vol. 4(5), pp. 1301–1306, October, 1989. See, for example, the circuit in FIG. 5 of this article which comprises an emitter-coupled logic (ECL) circuit consisting of an emitter coupled differential circuit in combination with a "totem pole" circuit comprising a coupled emitter-follower pull-up transistor and a coupled emitter follower pull-down transistor, including a bias current circuit for the node between the control capacitor and the base of the pull-down transistor. A substantially same circuit is also shown in FIG. 13 and described in U.S. Pat. No. 5,574,391, which patent represents an improved upon circuit over the FIG. 13 ECL circuit by eliminating the bias current circuit to provide for even further reduced power consumption through the utilization of current mirror transistor circuit arrangement.

Still, the power consumption is higher than desired for many applications, particularly the application of interest here which is the modulation of optical modulators. In this connection, none of the foregoing emitter-coupled logic circuits deal with the issue of the deployment of such drive circuits in an optical modulator environment, such as a semiconductor EAM that requires high frequency modulation, such as 10 GHz or 40 GHz signals, to be applied via RF transmissions 18 and 20. Another example of a totem pole bootstrap driver circuit used in telecommunications is illustrated in U.S. Pat. No. 6,002,269.

It is desirable that such high power dissipation in such drive circuits for high speed optical modulators be significantly reduced without the need for an RF transmission line and additional power consumption due to utilization of a pull-down transistor bias current circuit. This becomes particularly so where these drive circuits become integrated into packages containing photonic integrated circuit (PIC) chips, or even integrated as part of such a PIC chip in order that power and heat consumption can be minimized reducing both the overall power and dissipated heat budget of such packages and chips.

OBJECTS OF THE INVENTION

Therefore, it is an object of the present invention to overcome the aforementioned problem.

SUMMARY OF THE INVENTION

According to this invention, an optical modulator drive circuit provides a different approach to driving a optical modulator than presently employed, resulting in a reduction in power dissipation of the drive circuit by as much as about 80%. Therefore, this invention dissipates as little as 20% of power of the present drive circuits known in the art. The optical modulator may be a semiconductor electro-absorption modulator but the principle of the invention can be applied any other type of electro-optic modulator that relies on a voltage to modulate an optical signal.

The optical modulator is driven by an ECL circuit deployed in a "totem pole" or push-pull arrangement to apply a low-impedance voltage source to the optical modulator. No resistor is necessary in parallel with the modulator to provide the voltage to the optical modulator. The invention provides a relatively small current to charge and discharge the modulator capacitance, and is provided only during the bit transitions in the modulation of the signal. Outside of the modulation bit transitions, the current is automatically reduced even further. As a result, the output stage drive circuit nominally consumes much lower power by as much as 80%, which is approximately 20% of the prior art approaches, for example, power consumption in the range of about 0.1 W to about 0.20 W of power. This is of high importance where these circuits are deployed in connection with optical transmitter photonic integrated circuits (TxPICs) as illustrated in U.S. patent applications, Ser. No. 10/370,345 and 10/267,331, both filed on Oct. 8, 2002, which applications are incorporated herein by their reference. In this kind of optical integrated chip environment where there is an array of modulators integrated in a single semiconductor chip with a laser diode (LD) array, such as a DFB array, and an optical multiplexer, such as an AWG, power budget constraints become highly critical in the operation of the chip so that power consumption must be reduced to as low as possible without sacrificing high speed modulation such as at 10 GHz and 40 GHz.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 1 is a circuit diagram of the output drive stage of modulator drive circuit of the prior art.

FIG. 2 is a circuit diagram of the output drive stage of modulator drive circuit of this invention.

FIG. 3 is a circuit diagram of the modulator drive circuit of this invention including a buffer circuit to enhance circuit speed.

DETAILED DESCRIPTION OF THE INVENTION

Reference is now made to FIG. 2, showing the modulator drive circuit 30 according to this invention. Circuit 30 includes the components shown in FIG. 1 comprising emitter coupled differential circuit 11, the load resistors R1 and R2 for the signal source 22. In addition, the collectors of the differential transistor pair in circuit 11 are directly coupled to the base of "totem pole" driver transistors (Q1) 32 and (Q2) 34, the latter coupled through AC coupling control capacitor 36. The base of pull-down transistor 34 is coupled to bias, $V_{bias}$, through load resistor 38 for charging control capacitor 36.

Drive circuit 30 operates as follows. During the absence of bit transitions, i.e., in the steady-state condition, the collector-emitter currents of transistors 32 and 34 are approximately equal. During the rising edge of signal bit transition, the base of pull-up transistor 32, which is in the emitter follower configuration, rises rapidly. The emitter of transistor 32 is connected to the large parasitic capacitance of an electro-optic modulator 12 of the type that relies on a voltage to modulate an optical signal, such as, an electro-absorption modulator (EAM), and, therefore, cannot rise as rapidly as the voltage on the base of transistor 32. As a result, the base-emitter voltage of transistor 32 will be large, and transistor 32 will be strongly turned on. Simultaneously, the base of transistor 34, which is in the common emitter configuration, falls rapidly because the inverted rising edge of the rising bit transition can easily pass through AC coupling control capacitor 36. Transistor 34 is, therefore, turned off. The collector-emitter current of transistor 32, therefore, greatly exceeds the collector-emitter current of transistor 34. As an example, the collector-emitter current of transistor 32 may exceed the collector-emitter current of transistor 34 by as much as about 30 mA. This excess current serves to charge the parasitic capacitance of EAM 12 thereby developing the desired modulation voltage across the modulator. The excess current provided across modulator 12 ceases when, first, the base-emitter voltage of transistor 32 reaches the steady-state value due to the charging of the EAM parasitic capacitance, and, second, the base voltage of transistor 34 reaches a steady-state value due to the charging of control capacitor 36 through load resistor ($R_L$) 38.

During the falling edge of a signal bit transition, the base emitter voltage of transistor 32 will rapidly fall while the base emitter voltage of transistor 34 is rapidly turned on to provide for a strong pull down current to be applied to EAM 12 thereby rapidly discharging the parasitic capacitance of the optical modulator.

Because drive circuit 30 does not require the modulator impedance to be matched to a transmission line impedance, it is important that a transmission line for transfer of the modulated signal between drive circuit 30 and modulator 12 in the region indicated at 40 not be of any significant length, e.g., be equal to or less than about $$\frac{\lambda}{10},$$

where λ is the wavelength corresponding to the highest frequency of interest in the signal.

Reference is now made to circuit in 50 FIG. 3 which discloses the circuit of FIG. 2 but includes, in addition, an extra buffer circuit 54 between emitter coupled differential circuit 52 and totem pole driver circuit 56. Circuit 54 comprises follower transistors 58 and 60 connected to current sources 59 and 61. The deployment of circuit 54 enhances the circuit speed of circuit 50.

While the invention has been described in conjunction with several specific embodiments, it is evident to those skilled in the art that many further alternatives, modifications and variations will be apparent in light of the foregoing description. For example, principal of operation of the drive circuit of this invention may be applied to other types of optical modulators, other than EAMs such as Mach-Zehnder modulators or any other type of electro-optic modulator that relies on the electro-optic effect to change the refractive index of a certain material through the application of an applied electric field. Thus, the invention described herein is intended to embrace all such alternatives, modifications, applications and variations as may fall within the spirit and scope of the appended claims.

What is claimed is:

1. An optical modulator drive circuit for the type of electro-optic modulator that relies on a voltage to modulate an optical signal comprising:

an emitter coupled differential circuit for establishing a modulator bias level and the peak-to-peak swing of signal modulation and having a signal output and an inverted signal output;

a totem pole driver circuit comprising a pull-up emitter follower transistor and a pull-down emitter follower transistor having a modulated signal output between an emitter of the pull-up transistor and a collector of the pull-down transistor, a base of the pull-up transistor coupled to the signal output and a base of the pull-down transistor coupled to the inverted signal output through a control capacitor; and the electro-optic modulator coupled to the modulated signal output of the totem pole driver circuit.

2. The optical modulator drive circuit of claim 1 wherein the electro-optic modulator comprises an electro-absorption modulator.

3. The optical modulator drive circuit of claim 2 further comprising a load resistor coupled to a bias and to the control capacitor to charge the control capacitor during a rising edge of a signal bit transition of the signal modulation.

4. The optical modulator drive circuit of claim 1 further comprising a load resistor coupled to a bias and to the control capacitor to charge the control capacitor during a rising edge of a signal bit transition of the signal modulation.

* * * * *